US008681355B2

(12) United States Patent
Schwartz et al.

(10) Patent No.: US 8,681,355 B2
(45) Date of Patent: Mar. 25, 2014

(54) PRINTER DRIVER WITH CONTEXT BASED RESTRICTIONS

(75) Inventors: Richard A. Schwartz, Portland, OR (US); Jonathan A. Edmonds, Silverton, OR (US); David L. Salgado, Victor, NY (US); Jeremy H. L. Griffith, Rochester, NY (US); Matthew D. Fabrizi, Penfield, NY (US)

(73) Assignee: Xerox Corporation, Norwalk, CO (US)

( * ) Notice: Subject to any disclaimer, the term of this patent is extended or adjusted under 35 U.S.C. 154(b) by 678 days.

(21) Appl. No.: 12/253,947

(22) Filed: Oct. 18, 2008

(65) Prior Publication Data

US 2010/0097630 A1 Apr. 22, 2010

(51) Int. Cl.
*G06F 3/12* (2006.01)
*G06K 15/00* (2006.01)
*H04N 1/00* (2006.01)

(52) U.S. Cl.
USPC ....... 358/1.15; 358/1.13; 358/1.16; 358/1.18; 358/403

(58) Field of Classification Search
CPC .... G06F 1/1671; G06F 1/1694; G06F 1/1696
USPC .............. 358/1.14, 1.15, 1.16, 474, 403, 408, 358/1.18, 1.13; 399/15; 235/435, 449; 709/223; 345/156
See application file for complete search history.

(56) References Cited

U.S. PATENT DOCUMENTS

| | | | | |
|---|---|---|---|---|
| 5,748,927 | A * | 5/1998 | Stein et al. | 715/711 |
| 6,202,092 | B1 * | 3/2001 | Takimoto | 709/225 |
| 6,678,866 | B1 * | 1/2004 | Sugimoto et al. | 715/203 |
| 7,102,777 | B2 * | 9/2006 | Haraguchi | 358/1.15 |
| 7,227,651 | B2 * | 6/2007 | Kamiya | 358/1.14 |
| 7,280,238 | B2 * | 10/2007 | Akiyoshi | 358/1.14 |
| 7,382,487 | B2 * | 6/2008 | Ikegami | 358/1.6 |
| 7,400,427 | B2 * | 7/2008 | Honma | 358/1.15 |
| 7,456,992 | B2 * | 11/2008 | Fukuhara et al. | 358/1.16 |
| 7,570,377 | B2 * | 8/2009 | Fukuhara | 358/1.14 |
| 7,604,160 | B2 * | 10/2009 | Imine et al. | 235/375 |
| 7,663,773 | B2 * | 2/2010 | Minato | 358/1.15 |
| 7,730,191 | B2 * | 6/2010 | Otsuka et al. | 709/227 |
| 7,764,393 | B2 * | 7/2010 | Yamada et al. | 358/1.15 |
| 7,787,137 | B2 * | 8/2010 | Akiyoshi | 358/1.14 |
| 7,835,019 | B2 * | 11/2010 | Sugishita et al. | 358/1.14 |
| 7,876,465 | B2 * | 1/2011 | Matsueda | 358/1.15 |
| 7,894,093 | B2 * | 2/2011 | Minato | 358/1.15 |
| 2006/0132823 | A1 * | 6/2006 | Sakamoto | 358/1.14 |
| 2008/0007758 | A1 * | 1/2008 | Miyashita | 358/1.14 |

* cited by examiner

*Primary Examiner* — Vincent Rudolph
*Assistant Examiner* — Moustapha Diaby
(74) *Attorney, Agent, or Firm* — Ronald E. Prass, Jr.; Prass LLP

(57) ABSTRACT

According to aspects of the embodiments, there is provided methods of controlling operation of a printer, apparatus and computer-readable medium. The embodiments control operation of a printer by receiving a print command for printing from a user, and displaying a print user interface including selectable document settings and context based restrictions. Context based restrictions allows a system administrator to flexibly manage users access to a device features and capabilities. A variety of restrictions can be specified including time-based, capacity-based, and application-based. This invention also prevents the user from submitting a job with a restricted feature. Advantages are a clear, understandable presentation of restrictions to the user so the user knows what features the user cannot access.

17 Claims, 9 Drawing Sheets

PRINTER DRIVER WITH CONTEXT BASED RESTRICTIONS

BACKGROUND

Disclosed herein are methods to user interfaces for document-processing devices, such as copiers, printers, scanners, and the like, and in particular to such methods that implement context based restrictions, as well as corresponding apparatus and computer-readable medium.

Image forming devices such as printers, copiers and multifunction devices provide users the ability to print from a device such as a desktop or laptop computer, a handheld computer, or other electronic devices to a printer connected to the device. The electronic devices may be stand alone devices, or may be connected in a network, such as in a business computing environment, which may include one or more printers.

In order for a printer to interface with and function with the computer to which it is connected, a printer driver can typically be installed on the computer. A printer driver is software which controls the printer from the computer. The printer driver may include a user interface which may be typically accessed by a user through an operating system or an application program, such as a word processing program, a spreadsheet program, or other types of programs, and viewed on a display. Through the user interface, a user may view the supported printing features of the printing device. Within many enterprise environments, system administrators want to more tightly control their user's access to several functions of the printing device because they can lead to the wasting and mismanagement of resources.

For the reasons stated above, and for other reasons stated below which will become apparent to those skilled in the art upon reading and understanding the present specification, there is a need in the art for context based restrictions on the use of a resource such as a printer. There is also a need to inform a user on any context based restrictions through a print driver interface.

SUMMARY

According to aspects of the embodiments, there is provided methods of controlling operation of a printer, apparatus and computer-readable medium. The embodiments control operation of a printer by receiving a print command for printing from a user, and displaying a print user interface including selectable document settings and context based restrictions. Context based restrictions allows a system administrator to flexibly manage users access to a device features and capabilities. A variety of restrictions can be specified including time-based, capacity-based, and application-based. This invention also prevents the user from submitting a job with a restricted feature. Advantages are a clear, understandable presentation of restrictions to the user so the user knows what features the user cannot access.

DETAILED DESCRIPTION

Figure 1:
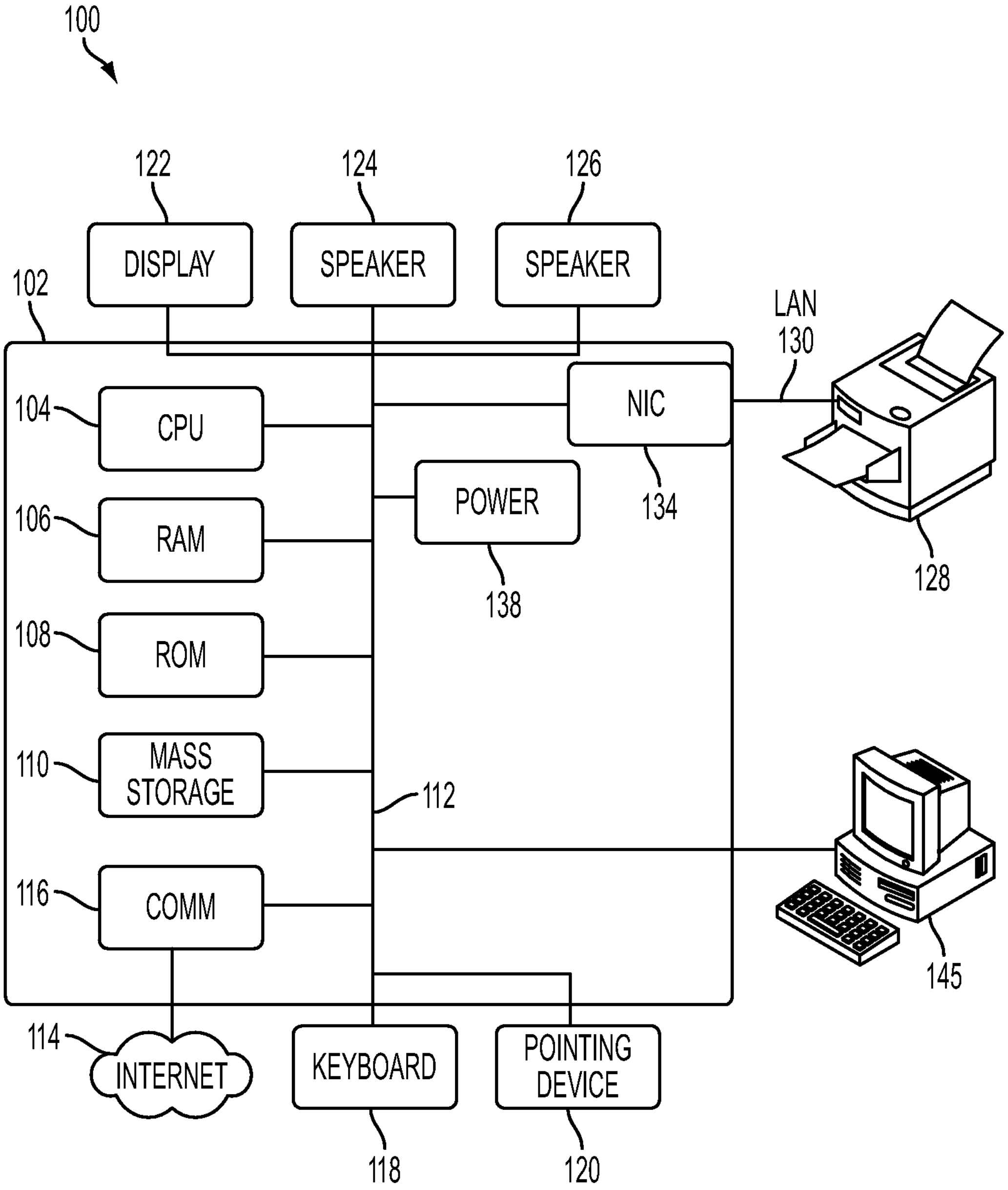
FIG. 1 illustrates a block diagram of a system for controlling a printer.

Aspects of the embodiments disclosed herein relate to methods for controlling operation of a printer, and corresponding apparatus and computer readable medium. The disclosed embodiments allow a user to view context based restrictions and to select one or more document settings to be used when printing documents from that particular application.

The disclosed embodiments include methods for receiving a print command for printing from a user, displaying a print user interface including selectable document settings and context based restrictions, receiving an indication from the user of selected ones of the documents settings, and controlling printing of documents opened in the application to print on the printer using the selected document settings. The disclosed embodiment proposes varied types of restriction contexts. A base restriction context is always in effect. A time based restrictions prohibit the user from using the feature or feature option during specific day or time periods. A capacity based context types restrict a user from accessing the feature or feature option when a print capacity has been exceeded. An application based restriction restricts the feature or feature option when printing from select software applications.

The disclosed embodiments further include an apparatus for controlling printing of a document on a printer. The apparatus includes a memory that stores print driver instructions; and a processor that executes the print driver instructions to cause printing of the document when receiving a print command for printing from a user by: receiving an indication from the user of selected ones of the documents settings; and displaying a print user interface with selectable document settings and context based restrictions, wherein the context based restrictions limit some of the selectable document settings.

The disclosed embodiments further include a context based print driver comprising a computer-readable memory that stores context based print driver instructions for execution by a processor of an electronic device, the context based print driver instruction corresponding to an access profile of the user to a resource; the context based print driver instructions cause the processor of the electronic device to select one of a plurality of access profiles indicated by the context based print driver instructions to correspond to the privileges of the user and to implement the selected access profile on the electronic device; and an interface for connection to the electronic device.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD- ROM or other optical disk storage, magnetic disk storage or other magnetic storage devices, or any other medium which can be used to carry or store desired program code means in the form of computer-executable instructions or data structures. When information is transferred or provided over a network or another communications connection (either hard wired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

The term “application”, in the disclosed embodiments, refers to a program designed for end users of a computing device, such as a word processing program, a database program, a browser program, a spreadsheet program, a gaming program, and the like. An application is distinct from systems programs, which are low-level programs that interact with the computing device at a very basic level, such as an operating system program, a compiler program, a debugger program, programs for managing computer resources, and the like.

A printer “document setting” in the disclosed embodiments, refers to a setting of a feature of a document to be printed that can be selected and saved by the user. Examples of printer document settings are settings for stapled or not stapled, paper size, watermark, paper tray, print resolution, single sided or double sided printing, and color printing or black and white printing. A printer “default setting” refers to one or more document settings that are saved as a default setting to be automatically used for printing unless manually changed at the time of printing. A printer “application default setting” refers to one or more document settings that are saved as an application default setting to be automatically used for printing of documents opened in the application unless the settings are manually changed at the time of printing.

The term “context based restrictions” (CBR) refers to a user’s access to important device features and feature options. The CBRs concept can be a context restriction database or data structure that defines what users are restricted from which device features under which conditions.

The term “printer driver” or “print processor” is a piece of software that converts data to be printed to the form specific to a printer. A print driver as used herein provides a print driver dialog interface or dialog interface so that a user can receive information and select document settings.

FIG. 1 is a block diagram of a hardware and operating environment 100 in which different embodiments can be practiced. The description of FIG. 1 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 102 or workflow server includes a processor 104, commercially available from Intel, Texas Instruments Inc., Sun Microsystems Inc., Freescale Semiconductor Inc., Advanced Micro Devices, Inc., Cyrix and others. Computer 102 also includes random-access memory (RAM 106, read-only memory (ROM 108, and one or more mass storage devices 110, and a system bus 112, that operatively couples various system components to the processing unit 104. The memory 106, 108, and mass storage devices, 110, are types of computer-accessible media. Mass storage devices 110 are more specifically types of nonvolatile computer-accessible media and can include one or more hard disk drives, floppy disk drives, optical disk drives, and tape cartridge drives. The processor 104 executes computer programs stored on the computer-accessible media.

The memory 106, 108, and mass storage devices, 110 may store instructions that may be executed by the processor to perform various functions. For example, the memory may store printer driver instructions to allow the system to perform various printing functions in association with a particular printer 128 connected to the computer. The printer driver instructions are typically unique to each specific type of printer, and computer 102 may store a plurality of print drivers each for a different printer 128.

Computer 102 can be communicatively connected to the Internet 114 via a communication device 116. Internet 114 connectvity is well known within the art. In one embodiment, a communication device 116 is a modem that responds to communication drivers to connect to the Internet via what is known in the art as a “dial-up connection.” In another embodiment, a communication device 116 is an Ethernet® or similar hardware network card connected to a local-area network (LAN) that itself is connected to the Internet via what is known in the art as a “direct connection” (e.g., T1 line, and the like).

A user enters commands and information into the computer 102 through input devices such as a keyboard 118 or a pointing device 120. The keyboard 118 permits entry of textual information into computer 102, as known within the art, and embodiments are not limited to any particular type of keyboard. Pointing device 120 permits the control of the screen pointer provided by a graphical user interface (GUI) of operating systems such as versions of Microsoft Windows®. Embodiments are not limited to any particular pointing device 120. Such pointing devices include mice, touch pads, trackballs, remote controls and point sticks. Other input devices (not shown) can include a microphone, joystick, game pad, satellite dish, scanner, or the like.

In some embodiments, computer 102 is operatively coupled to a display device 122. Display device 122 is connected to the system bus 112. Speakers 124 and 126 provide audio output of signals. Speakers 124 and 126 are also connected to the system bus 112. Display device 122 permits the display of information, including computer, video and other information, for viewing by a user of the computer. Embodiments are not limited to any particular display device 122. Such display devices include cathode ray tube (CRT) displays (monitors), as well as flat panel displays such as liquid crystal displays LCD's). In addition to a monitor, computers typically include other peripheral input/output devices such as printer 128. Printing from a computer 102 to a printer 128 occurs in one of two modes, direct connect or point and print. Direct connect is where the driver stored on the computer sends print jobs directly to the printer. Point and print is where a server is connected to one or more client computers, the server acts as a print server, and the print jobs go from the client computer to the print server and then to the printer. Computer 102 also includes an operating system (not shown) that is stored on the computer-accessible media RAM 106, ROM 108, and mass storage device 110, and is executed by the processor 104. Examples of operating systems include Microsoft Windows®, Apple MacOSO®, Linux®, UNIX®. Examples are not limited to any particular operating system, however, and the construction and use of such operating systems are well known within the art.

Embodiments of computer 102 are not limited to any type of computer 102. In varying embodiments, computer 102 comprises a PC-compatible computer, a MacOS®-compatible computer, a Linux®-compatible computer, or a UNIX®-compatible computer. The construction and operation of such computers are well known within the art. Computer 102 can be operated using at least one operating system to provide a graphical user interface (GUI) including a user-controllable pointer. Computer 102 can have at least one web browser application program executing within at least one operating system, to permit users of computer 102 to access an intranet, extranet or Internet world-wide-web pages as addressed by Universal Resource Locator (URL) addresses. Examples of browser application programs include Netscape Navigator® and Microsoft Internet Explorer®.

The computer 102 can operate in a networked environment using logical connections to one or more remote computers 145. These logical connections are achieved by a communication device coupled to, or a part of, the computer 102. Embodiments are not limited to a particular type of communications device. The remote computer 145 can be another computer, a server, a router, system administrator console, a network PC, a client, a peer device or other common network node. The logical connections depicted in FIG. 1 include a local-area network (LAN) 130 or a wide-area network WAN). Such networking environments are commonplace in offices, enterprise-wide computer networks, intranets, extranets and the Internet.

When used in a LAN-networking environment, the computer 102 and remote computer are connected to the local network 130 through network interfaces or adapters 134, which is one type of communications device 116. The remote computer 145 also includes a network device. When used in a conventional WAN-networking environment, the computer 102 and remote computer communicate with a WAN through modems (not shown). The modem, which can be internal or external, is connected to the system bus 112. In a networked environment, program modules depicted relative to the computer 102, or portions thereof, can be stored in the remote computer 145. Computer 102 also includes power supply 138. Each power supply can be a battery.

A system administrator through remote computer 145 promulgates context based restrictions that define what users are restricted from which device features and under which conditions. The context based restrictions (CBR) is an access profile of a user to a resource such as a printer. The user as used herein could be a computer, a user of the computer, or a software application. CBR should insure that resources and users have some of the following capabilities: (a) each user accessing a resource has associated with login credentials specific permissions regarding the ability to access the resource wherein the resource may define particular features and associated options of that feature, which should be launched into a different option when a user with specified feature level permissions launches a print driver; and b) each user accessing the resource has associated with login credentials, specific permissions regarding the ability to access specific features of each application—for example, some users may have access only at certain period of the day or week, while other users are limited when a capacity is exceeded by the user.

Printing from computer 102 to printer 128 occurs in one of two modes, direct connect or point and print. Direct connect is where the driver stored on the computer sends print jobs directly to the printer. Point and print is where a server such as remote computer 145 is connected to one or more client computers, the server acts as a print server, and the print jobs go from the computer 102 to the print server and then to the printer 128.

In a point and print environment, what typically occurs is the application and the spooler bundleup with is called EMF (Encapsulated Meta File) data, and pass it along with the DEVMODE to the print server. On the print server, the EMF file (Encapsulated Meta File) is actually turned into PDL (e.g. PostScript or PCL). This is when the DEVMODE settings are typically converted into actual commands the printer can understand. However, this occurs on the server, not on the client computer, so the application defaults must have been applied prior to submitting the job to the server, or they could not be found. Accordingly, the application default setting is pushed to the print server before the application is opened, ensuring that it's 'default' DEVMODE was really one that was already manipulated. Specifically, the defaults are set during MergeAndConvert for the DEVMODE callback. Thus, when the DEVMODE is packaged up with the EMF file and sent to the server, it already has the relevant changes made to it, and the output is what the user would have expected.

Computer 102 and printer 128 can form part of a workflow production system which uses paper job requests, also known as paper job tickets, which are readable both by a human operator and by a computer. Specifications for the performance of tasks of a workflow that need to be performed by machines and a human operator (user) operating the machines are printed on a paper job request together with additional machine readable markings. The human operator performs the tasks, e.g., setting machine parameters or selectable settings, as specified on the paper job request, and marks the paper job request, as in a traditional work flow, with indications of the state of the task. The marked paper job request is scanned by a scanning device and the machine readable markings are interpreted by a workflow server managing the electronic job request. The marks made by the human operator are also interpreted by the workflow server, providing feedback information regarding the current status of the workflow to the workflow server. The workflow continues under the control of the workflow server, including using electronic job requests and/or paper job requests. Each module of the workflow module and the human interface module is a software module including a series of programmable instructions capable of being executed by the processor 102. Computer 102 contains workflow module that include a set of programmable instructions capable of being executed by processor 104 for receiving workflow instructions via the work entry module, and for generating a corresponding electronic workflow including electronic machine readable job requests that are provided to the workshop equipment for controlling the workshop equipment to perform jobs of the workflow. The controlling of the workshop equipment may include setting up and operating machinery performing scanning, faxing, archiving, transmitting, and paper copy reproduction. The electronic job requests may be provided, for example, in job definition format (UDF), which is an extensible markup language (ML) based format for workflow and control information.

Figure 2:
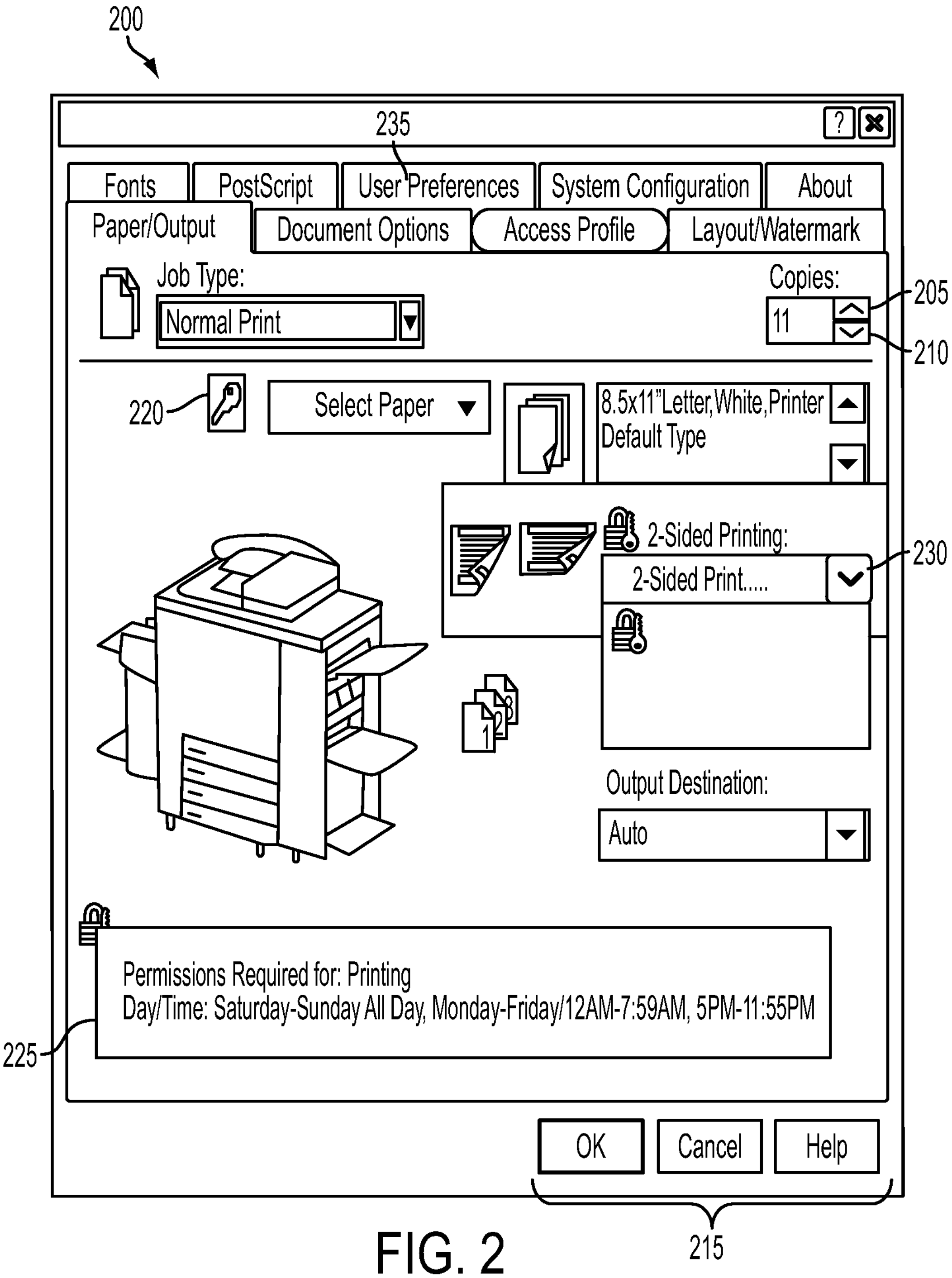
FIG. 2 illustrates a diagram of a print driver user interface in accordance to an embodiment.

FIG. 2 illustrates a printer user interface 200 or graphical user interface (GUI) that may be displayed on a display of computer 102. The settings will automatically be used and displayed on the GUI whenever the user selects the corresponding print driver via selection of the printer. Devices such as scanners, faxing machines, archiving devices, transmitting devices, and paper copy reproduction devices have different print drivers, and selection of a particular printer for printing will open the corresponding print driver. The printer user interface 200 may be invoked and displayed when a user selects a print function on the computer 102, typically using an input device such as keyboard 118, for example.

The print driver invokes a user interface (GUI) with at least one feature in the form of pull-down menus. The print driver can provide interfacing to devices or machines capable of performing scanning, faxing, archiving, transmitting, and paper copy reproduction. A pull-down menu will display to the user a list of options associated with that feature. These options, when selected, designate certain operations to be performed when printing the copies. In many situations, the print driver will offer the user the opportunity to print multiple copies. The user interface 200 includes a feature 205 labeled "Copies." The user may type the number of copies desired in the feature 205, or the user may use the arrows 210 to increase or decrease the number of copies. In another example, the user will typically be offered the choice of printing one or two sided copies. As shown, the user interface has a feature 230 labeled "2 sided printing," under which the user has normally the option of selecting "one-sided", "two-sided" portrait, or "two-sided" landscape. As shown, the user is prevented from the selection of a feature other than "two-sided" print.

The print driver positions a permission icon near the selectable feature so that the user is made aware that a restriction on invoking the feature is in place. The permission icon, shown as a symbolic lock, is to a time based restriction (TBR). A TBR prevents the selection of some of the document settings or feature option during a specific period. The message indicates to the user that permission is required for printing during non-business hours. A permission icon can be of varying shapes and colors, and can be separated into classes based on their respective function. For example icon 220, shown as a key, is a link to a dialog box. The link when activated opens a window or box 600, such as that shown in FIG. 6. The box 600 informs the user about all the restriction on features or feature options associated with the account, computer, or user. Command buttons 215 transfer control of printing the documents to the print driver or to cancel the printing process. When the user clicks on the OK button 215 on the print user interface of the application, the user's selections are sent to the print driver for further processing. Property 235 is a link to further printer user interfaces, as illustrated herein, so that the user can select "User preferences", "Document Options", "Access Profile", and the like.

Figure 3:
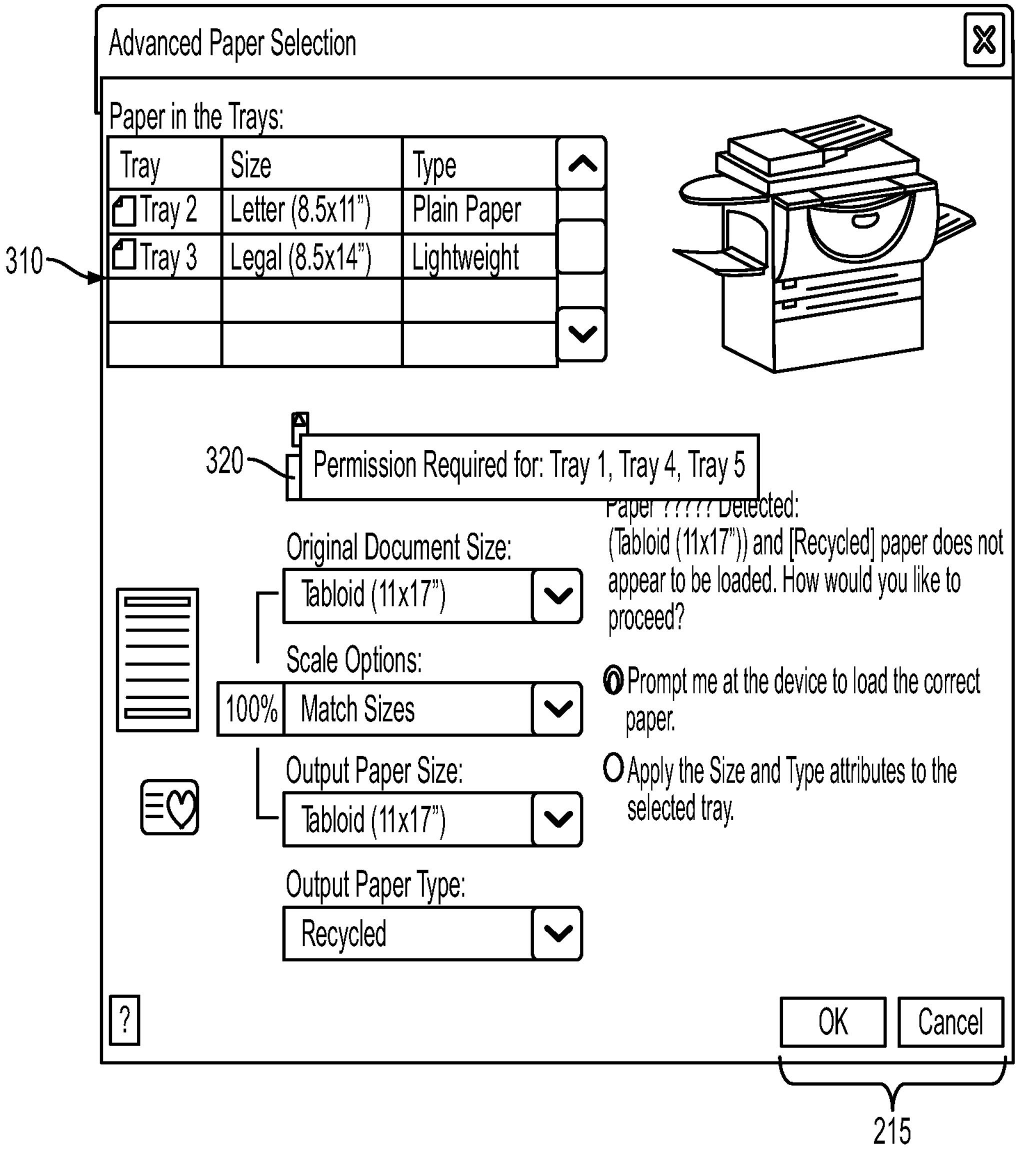
FIG. 3 illustrates a diagram of the advanced paper selection print driver user interface in accordance to an embodiment.

FIG. 3 illustrates a diagram of an advanced paper selection print driver user interface 300 in accordance to an embodiment. The print driver user interface is in the form of a paper entry dialog box. Note that print driver through the user interface prohibits the selection of a feature 310 that a user is excluded from, only trays 2 and 3 are selectable by the user. In addition, the print driver will prohibit the user from viewing bidirectional information relating to a prohibited feature such as the number of trays in the selected printer. Permission icon 340 will inform the user that tray 1, and trays 4-5 required permission to be available to the user as a feature option.

Figure 4:
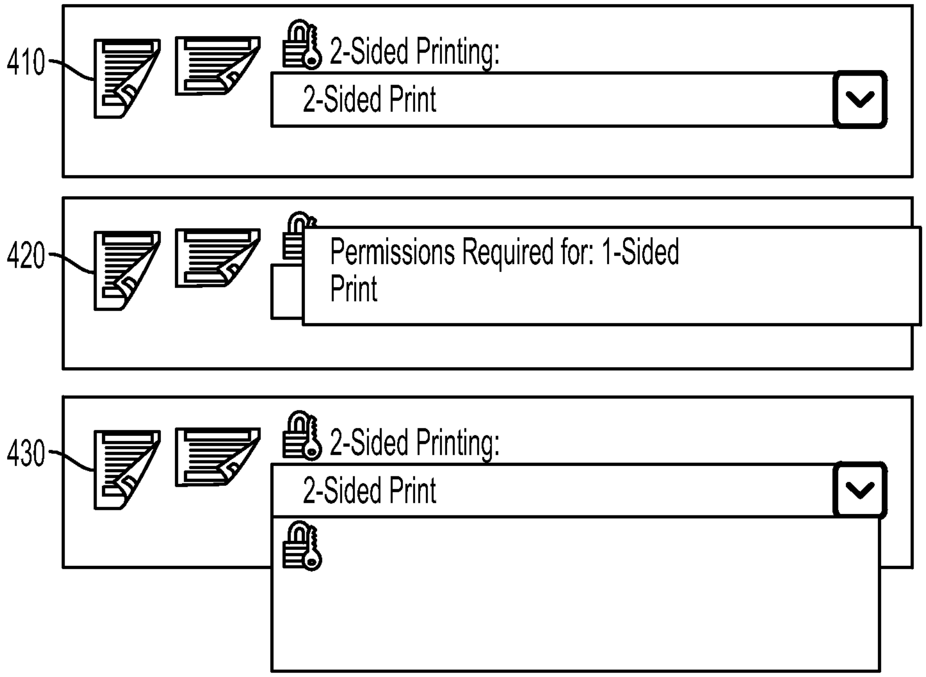
FIG. 4 illustrates a diagram of a two-sided printing restriction in accordance to an embodiment.

FIG. 4 illustrates a diagram of a two-sided printing restriction in accordance to an embodiment. The permission icon 410 indicates that a restriction is in place concerning 2-sided print. The user can position a cursor using any of the input devices to see the message 420 or the particular of the restriction. Message 420 shows that permission is required for 1-sided printing. The print driver limits 430 the user's ability to select 1-sided printing and presents a permission icon next to the option.

Figure 5:
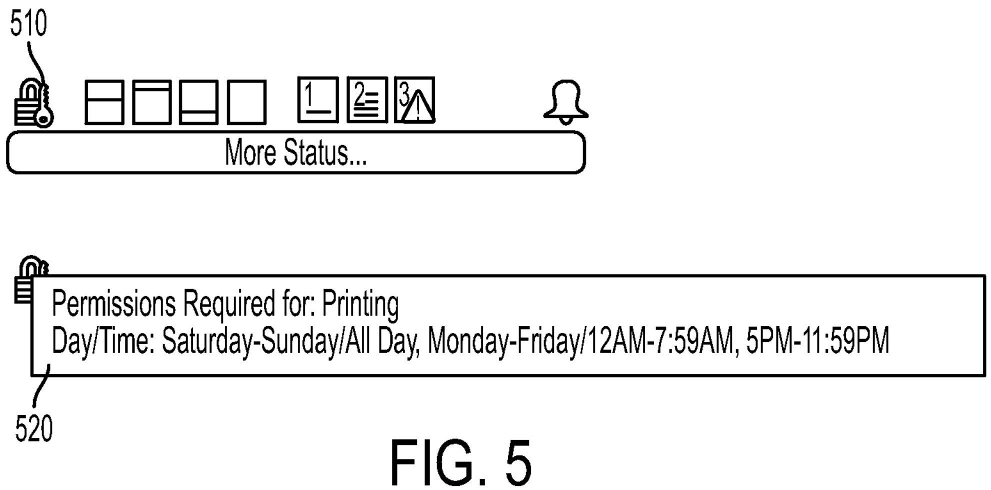
FIG. 5 illustrates a diagram of a time based restriction in accordance to a possible embodiment.

FIG. 5 illustrates a diagram of a time based restriction in accordance to a possible embodiment. The print driver positions permission icon 510 on a status bar at the print user interface. A message about the time based restriction 520 is positioned where a user is able to readily appreciate that a context based restriction is in effect. The shown time based restriction 520 prohibits printing within a certain period of the day. The time based restriction prevents workflow from being executed in the printer driver. Since the user can not currently execute the print workflow, the print driver prohibits the submission of a print job and presents the restricted printing permissions details to the user in the form of a message box or the like. The print driver could also provide the user with the full set of restrictions they have on printing resources by activating permission icon 510.

Figure 6:
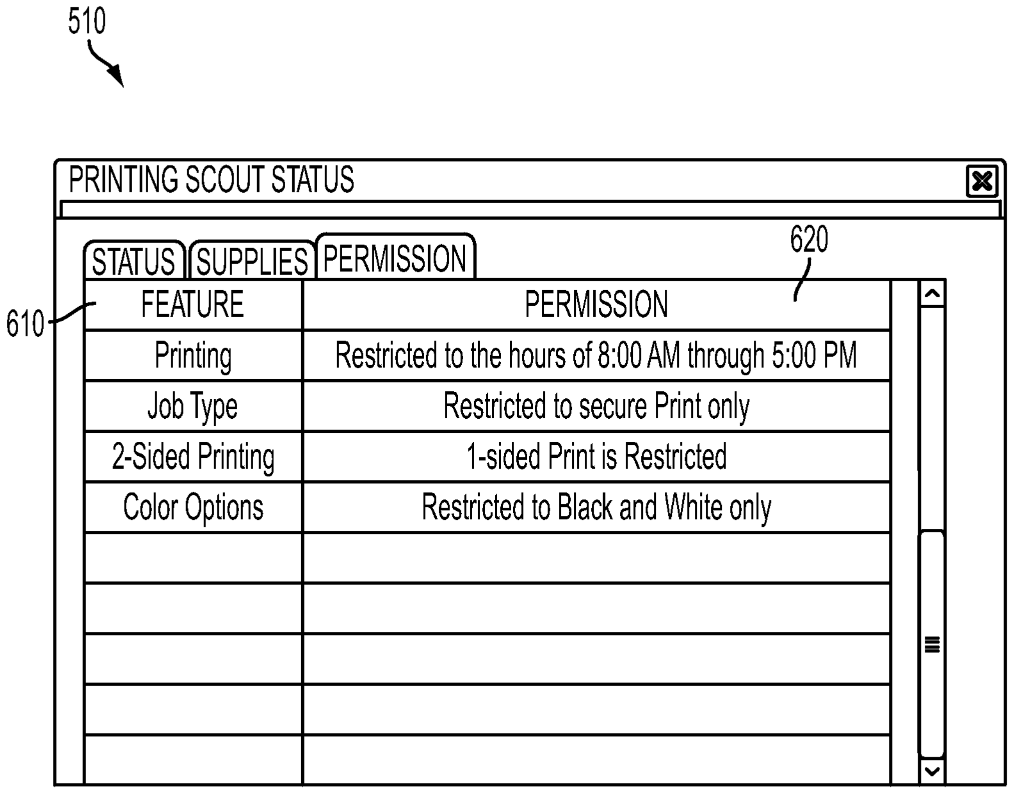
FIG. 6 illustrates a diagram of a print driver user interface showing user restrictions to a printing resource in accordance to a possible embodiment.

FIG. 6 illustrates a diagram of a print driver user interface showing user restrictions 510 to a printing resource in accordance to a possible embodiment. The user restrictions box 510 informs the user of the context based restrictions that limits the use of a printing resource. The message in the user restriction box 510 informs the user that certain features 610 require permission 620 or restricted. For example, the user would be able to see that the feature printing 610 is restricted to hours 8:00 AM to 5:00 PM. As can be seen user restriction box 610 can show other features 610 and other restrictions 620. The language used inside the user restriction box 510 is meant to be an example of how the information can be presented to the user, and, of course, any language conveying a similar meaning may be used. The message included in the user restriction box 510 is helpful because it marshal all the restriction in a single place for the user to inspect.

Figure 7:
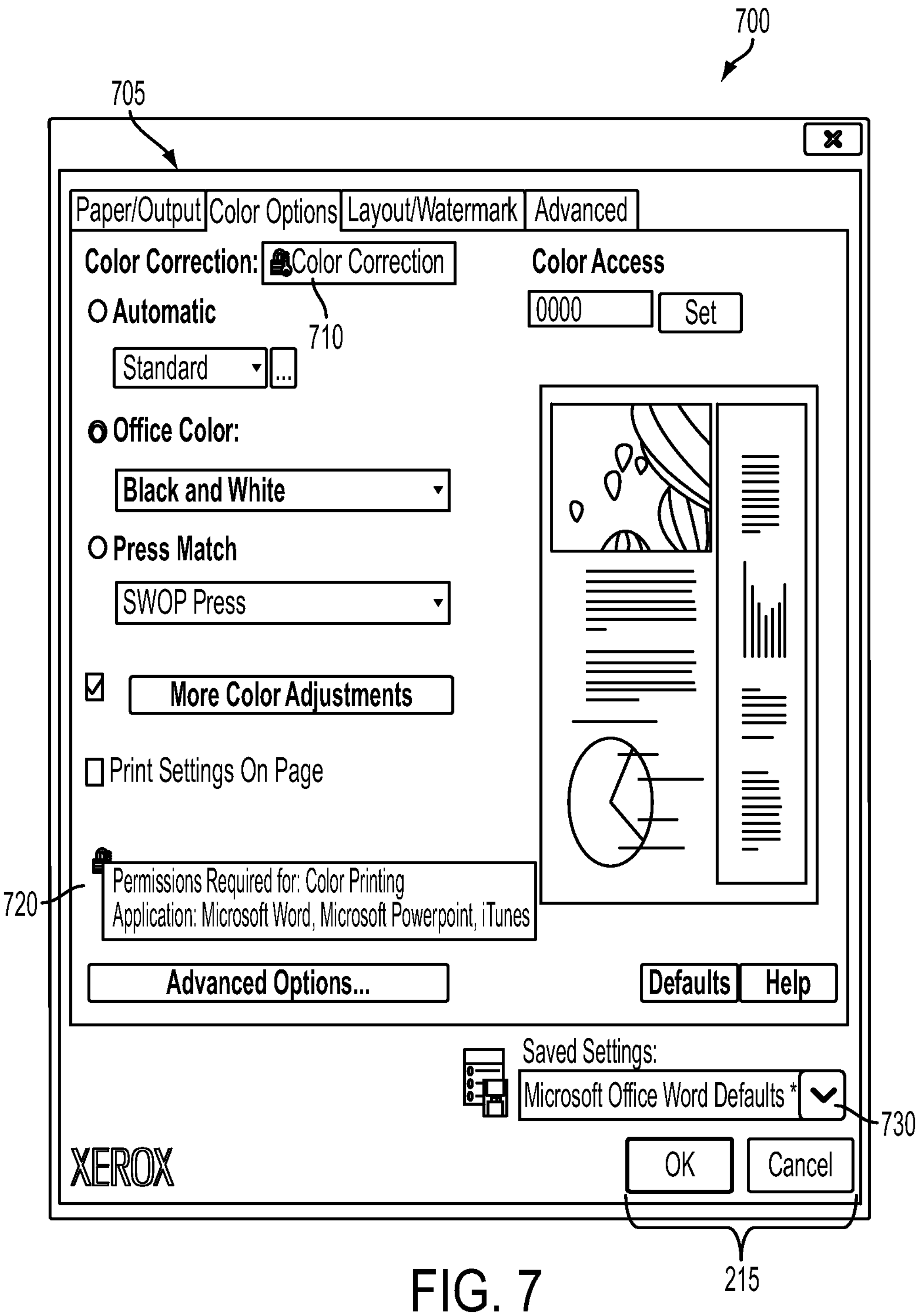
FIG. 7 illustrates a diagram of a print driver user interface displaying user restriction in accordance to a possible embodiment.

FIG. 7 illustrates a diagram of a print driver user interface displaying user restriction in accordance to a possible embodiment. The printer user interface 700 is illustrated with the color options 705-document setting selected by a user, and with office color selected to black and white. A permission icon 710 indicates that a restriction is applicable to color correction. Additionally, the default application setting 730 allows the user to select and save as an application default such as a Microsoft Office Word default. A message about the color correction restriction 720 is positioned where a user is able to readily appreciate that a context based restriction is in effect. As shown, the user is notified that color correction is prohibited for certain software applications.

Figure 8:
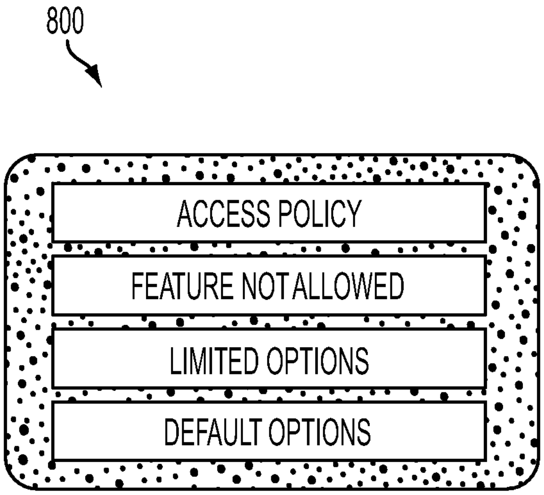
FIG. 8 illustrates a diagram of an access policy data structure in accordance to a possible embodiment.

FIG. 8 illustrates a diagram of an access policy data structure 800 in accordance to a possible embodiment. The access policy data structure 800 comprising feature not allowed, limited options, and default options. These access policies have pointers to a local memory address such as memory 106 in FIG. 1. The feature not allowed is a list of feature that the user is not allowed to invoke when printing. The limited options are a list of features with restrictions on the options that are selectable by the user. The default options are features, for example number of copies to print, that are assigned a default value but that could be changed by the user. When a user invokes a print command, the print driver is configured in accordance to access policy data structure 800. The print driver prohibits the user from selecting the feature not allowed and from selecting feature options that are not allowed. Additionally, the print driver displays a permission icon on every feature enumerated on access policy data structure 800.

Figure 9:
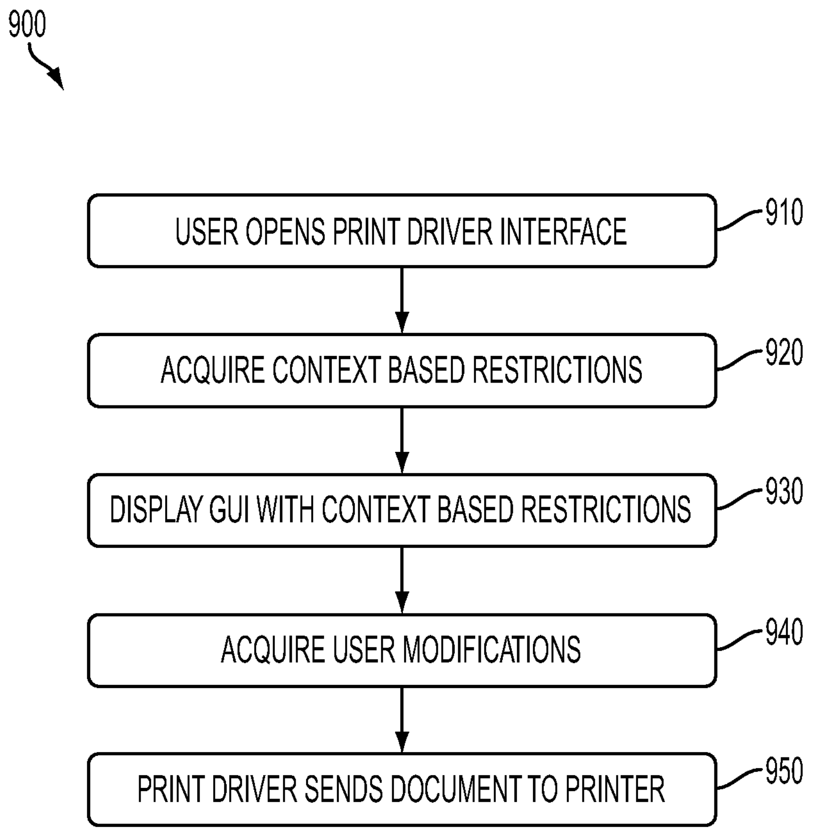
FIG. 9 illustrates a flowchart of a method for controlling a printer.

FIG. 9 illustrates a flowchart of method 900 for controlling a printer. In action 910, a request to open the print driver interface or GUI is received from a user. In action 920, the context based restrictions are acquired from memory 106. The access policy for the user or computer is used to generate a print driver tailored to the context based restrictions. In action 930 a GUI is displayed with selectable document settings, permission icon positioned near the selectable document settings, and context base restrictions. In action 940, the user enters any modifications through the document settings. In action 950, the print driver then assumes control of the print job and informs the application that one copy is being made.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A print driver user interface method for print processing a document, comprising:
- receiving a print command for printing the document from a user;
- acquiring context based restrictions for the user comprising at least a list of feature that the user is not permitted to invoke when printing the document;
- selecting a permission icon from icons of varying shapes and colors for all the acquired context based restrictions;
- generating a print user interface that includes a plurality of function tabs each associated with an option function with selectable document settings and the context based restrictions, wherein the context based restrictions limit some of the selectable document settings and wherein the context based restrictions comprises at least base restriction, time based restriction, capacity based restriction, or application based restriction;
- displaying at the generated print user interface an icon that when activated by the user displays a message indicative of all context based restriction for the user and all the restriction on features or feature options associated with an account, a computer, or the user;
- displaying at the generated print user interface at least one permission icon near the selectable document setting that is limited by the context based restrictions and where if the user using an input device positions a cursor on a permission icon a message is displayed indicative of a printing restriction;
- receiving through the generated print user interface an indication from the user of selected ones of the documents settings; and
- controlling printing of documents opened in an application using the selected document settings and the context based restrictions;
- wherein a capacity based restriction prevents the selection of some of the document settings if the user has exceeded a certain resource capacity;
- wherein a time based restriction prevents the selection of some of the document settings during a specific period.

2. The method of claim 1, wherein the at least one permission icon is a link that when selected causes a message to be displayed informing the user about all the restriction on features or feature options associated with an account or computer.

3. The method of claim 2, wherein the at least one permission icon to a time based restriction is a symbolic lock.

4. The method of claim 2, wherein the acquired context based restrictions are associated with a user's login credential.

5. The method of claim 4, wherein the document settings each define a feature of the document to be processed; wherein limiting some of the selectable document settings is at least one of preventing the selection of a feature, limiting options to a feature, or restricting the feature to a single option.

6. The method of claim 5, further comprising: processing the document using a process selected from the group including scanning, faxing, archiving, transmitting, and paper copy reproduction.

7. The method of claim 6, wherein controlling includes permitting the user to transfer control of printing the documents from the application to the print driver.

8. The method of claim 2, wherein a message is display on the permission icon when the user positions a cursor on it and wherein a time based restriction prevents the selection of some of the document settings during a specific period.

9. An apparatus for controlling print processing of a document, comprising:
- a memory that stores print driver instructions; and
- a processor that executes the print driver instructions to cause print processing of the document when receiving a print command for printing from a user by:
  - receiving a print command for printing the document from the user;
  - acquiring context based restrictions for the user comprising at least a list of feature that the user is not permitted to invoke when printing the document;
  - selecting a permission icon from icons of varying shapes and colors for all the acquired context based restrictions;
  - generating a print user interface that includes a plurality of function tabs each associated with an option function with selectable document settings and context based restrictions, wherein the context based restrictions limit some of the selectable document settings;
  - displaying at the generated print user interface an icon that when activated by the user displays a message indicative of all context based restriction for the user and all the restriction on features or feature options associated with an account, a computer, or the user;
  - displaying at the generated print user interface at least one permission icon near the selectable document setting that is limited by the context based restrictions and where if the user using an input device positions a cursor on a permission icon a message is displayed indicative of a printing restriction;
  - receiving through the generated print user interface an indication from a user of selected ones of the documents settings;
  - controlling printing of documents opened in an application to print on a printer using the selected document settings and context based restrictions, wherein printing is processing the document using a process selected from the group including scanning, faxing, archiving, transmitting, and paper copy reproduction;

wherein the context based restrictions comprises at least base restriction, time based restriction, capacity based restriction, or application based restriction;

wherein a time based restriction prevents the selection of some of the document settings during a specific period;

wherein a capacity based restriction prevents the selection of some of the document settings if the user has exceeded a certain resource capacity.

10. The apparatus of claim 9, wherein the at least one permission icon is a link that when selected causes a message to be displayed informing the user about all the restriction on features or feature options associated with an account or computer.

11. The apparatus of claim 10, wherein the at least one permission icon to a time based restriction is a symbolic lock.

12. The apparatus of claim 11, wherein the permission icon is positioned near the selectable document setting that is limited by the context based restrictions;

wherein the document settings each define a feature of the document to be printed;

wherein limiting some of the selectable document settings is at least one of preventing the selection of a feature, limiting options to a feature, or restricting the feature to a single option;

wherein controlling includes permitting the user to transfer control of printing the documents from the application to the print driver.

13. A print workflow server for processing an electronic print workflow for implementation by at least one machine, the print workflow server comprising:

a memory structure containing context based restrictions for a user comprising a list of feature that the user is not permitted to invoke to process the electronic print workflow;

a processor to execute instructions for processing the electronic print workflow having at least one machine readable job request, wherein the electronic print workflow contains context based restrictions that corresponds to an access profile of a user to the least one machine; and an interface to receive print commands from a user at a remote computer with a print user interface having a plurality of function tabs each associated with an option function with selectable document settings and the context based restrictions, wherein the context based restrictions limit some of the selectable document settings;

wherein the print user interface comprises a print command that when activated by the user commands the processing of a document in the electronic print workflow;

wherein processing the electronic print workflow is using a process selected from the group including scanning, faxing, archiving, transmitting, and paper copy reproduction;

wherein the processor selects a permission icon from icons of varying shapes and colors for all the context based restrictions wherein a context based restriction is displayed on the interface with at least one permission icon and where if the user using an input device positions a cursor on a permission icon a message is displayed indicative of a printing restriction;

wherein a context based restriction comprises at least one base restriction, time based restriction, capacity based restriction, or application based restriction;

wherein a time based restriction prevents the selection of some of the selectable document settings during a specific period;

wherein a capacity based restriction prevents the selection of some of the selectable document settings if the user has exceeded a certain resource capacity;

wherein the print user interface includes an icon that when activated by the user further opens a message box with all context based restriction for the user;

wherein the print user interface includes at least one permission icon near a selectable document setting that is limited by the context based restrictions;

wherein a received print command causes the processor to select one of a plurality of access profiles indicated by the context based restrictions to correspond to the privileges of the user and to implement the selected access profile on the print workflow server.

14. The print workflow server of claim 13, wherein the at least one permission icon to a time based restriction is a symbolic lock.

15. The print workflow server of claim 14, wherein the at least one permission icon is a link that when selected causes a message to be displayed informing the user about all the restriction on features or feature options associated with an account or computer.

16. The print workflow server of claim 15, the context based restrictions driver instructions causing the remote computer to:

displaying at the print user interface, if the user positions a cursor on a permission icon, a message indicative of a particular restriction.

17. The print workflow server of claim 16, wherein the settings each define a feature to be printed; wherein limiting some of the selectable settings is at least one of preventing the selection of a feature, limiting options to a feature, or restricting the feature to a single option.

* * * * *